United States Patent
Koren

(10) Patent No.: US 6,561,700 B1
(45) Date of Patent: May 13, 2003

(54) FIBER OPTIC CABLE SPLICE APPARATUS AND METHOD

(75) Inventor: Pinhas Paul Koren, Altamonte Springs, FL (US)

(73) Assignee: SuperVision International, Inc., Orlando, FL (US)

( * ) Notice: Subject to any disclaimer, the term of this patent is extended or adjusted under 35 U.S.C. 154(b) by 0 days.

(21) Appl. No.: 10/010,634

(22) Filed: Nov. 5, 2001

(51) Int. Cl.⁷ .................................. G02B 6/38
(52) U.S. Cl. ................... 385/58; 385/70; 385/86
(58) Field of Search ................ 385/58, 55, 56, 385/69, 60, 70, 73, 72, 95–99, 86, 76

(56) References Cited

U.S. PATENT DOCUMENTS 5,233,674 A * 8/1993 Vladic ........................ 385/56
5,993,071 A * 11/1999 Hultermans ................. 385/70
6,464,406 B1 * 10/2002 Yarita et al. ................. 385/60

* cited by examiner

*Primary Examiner*—Phan T. H. Palmer
(74) *Attorney, Agent, or Firm*—Terry M. Sanks, Esq.; Beusse Brownlee Bowdoin & Wolter, P.A.

(57) ABSTRACT

An apparatus and method for connecting an end of a first fiber optic cable to an end of a second fiber optic cable, the apparatus comprising a first fiber optic cable comprising at least one plastic fiber, a second fiber optic cable comprising at least one plastic fiber, a first fitting have a cavity for securing the end of said first fiber optic cable, a second fitting for securing the end of said second fiber optic cable, and a connector for joining the first fitting to the second fitting to hold the end of the first fiber optic cable in alignment with the end of the second fiber optic cable to allow light to pass therebetween.

20 Claims, 2 Drawing Sheets

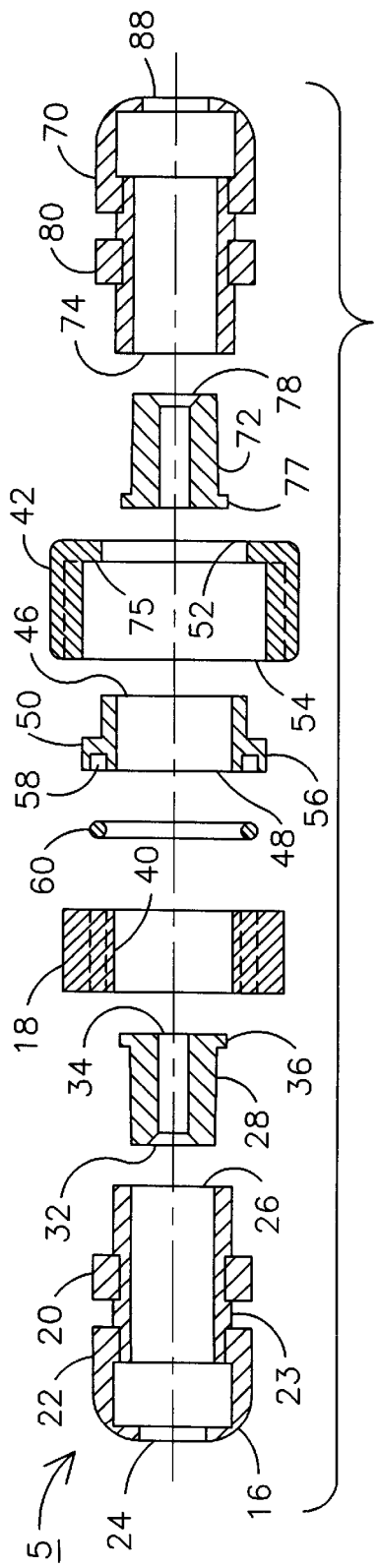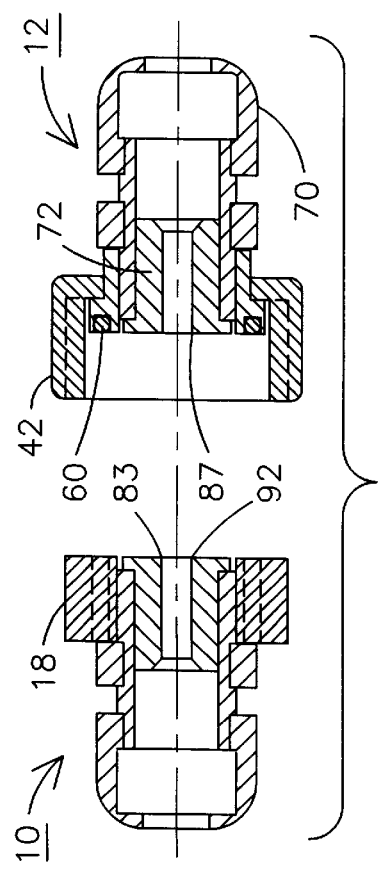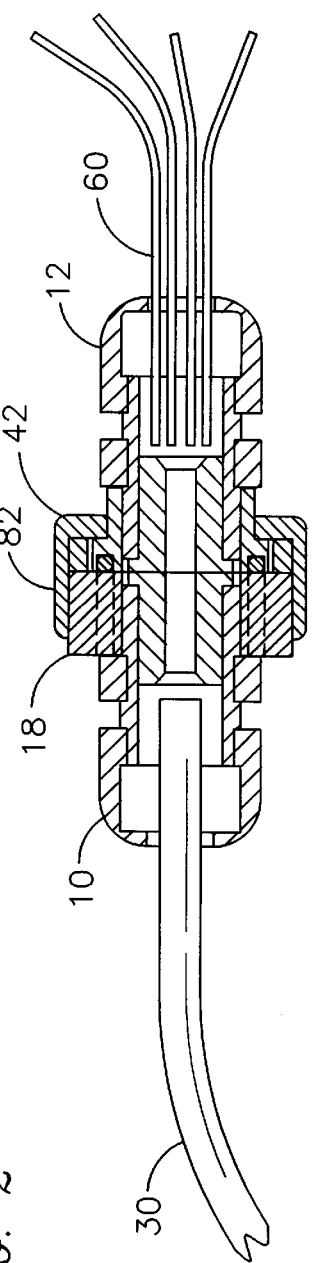
FIG. 1
FIG. 2
FIG. 4

FIBER OPTIC CABLE SPLICE APPARATUS AND METHOD

BACKGROUND OF THE INVENTION

The present invention relates to fiber optic cables and more specifically, to a coupling apparatus and method for connecting one or more fiber optic cables to a second fiber optic cable.

An optical fiber is an elongated glass or plastic filament, or fiber or strand, having a core region surrounded by one or more layers of cladding, with the core having a higher index of refraction than the cladding so that light introduced at one end of the fiber will be internally reflected for transmission longitudinally within the core channel to the other end of the fiber. A fiber optic cable comprises a sheath surrounding a multiplicity of optical fibers. The size of the fiber optic cable may vary widely depending on the number and size of the optical fibers within the sheath.

Typically, one end of the fiber optic cable is coupled to a light source to receive light energy, and the other end is positioned to emit the received light energy in an area to be illuminated. In another application, light is emitted from one or a plurality of sides of the fiber optic cable. Because fiber optic cables are often used to illuminate outdoor areas, the cables are exposed to the elements since the cables are either left laying above the ground or are buried underground. Either because of the elements, or because of damage unintentionally inflicted upon the cable, such as inadvertently striking the cable with a shovel, a fiber optic cable may become damaged to the extent that the sheath is pierced and the individual strands are severed.

Currently, when a cable is damaged, the complete cable must be replaced. Sometimes, because of the complexity involved in laying the original cable, the cost to replace the damaged cable can be expensive, even more than the original cost. For example, if part of a cable is buried underneath a decking surface adjacent to a pool, replacing the damaged cable may involve removing and replacing the decking surface.

SUMMARY OF THE INVENTION

In view of the prior history, users of fiber optic cables would benefit from a coupling or splicing apparatus where a damaged part of a cable can be removed and the resulting ends spliced together. Although there is a loss of light energy through a splice, the amount of energy passing is sufficient for many lighting applications and the cost to splice the cable is less than replacing the cable. In view of this need, an apparatus is providing for connecting an end of a first fiber optic cable to an end of a second fiber optic cable is needed. The apparatus comprises a first fiber optic cable comprising at least one plastic fiber, a second fiber optic cable comprising at least one plastic fiber, a first fitting have a cavity for securing the end of the first fiber optic cable, a second fitting for securing the end of the second fiber optic cable, and a connector for joining the first fitting to the second fitting to hold the end of the first fiber optic cable in alignment with the end of the second fiber optic cable to allow light to pass therebetween.

BRIEF DESCRIPTION OF THE DRAWINGS

The features and advantages of the present invention will become apparent from the following detailed description of the invention when read with the accompanying drawings in which:

FIG. 1 is an exemplary embodiment of the present invention separated to illustrate each part;

FIG. 2 is an exemplary embodiment of the present invention where a first part and second part for receiving a cable are formed but not connected to the other;

FIG. 4 is an embodiment of the present invention fully connected.

DETAILED DESCRIPTION OF THE INVENTION

Figure 3:
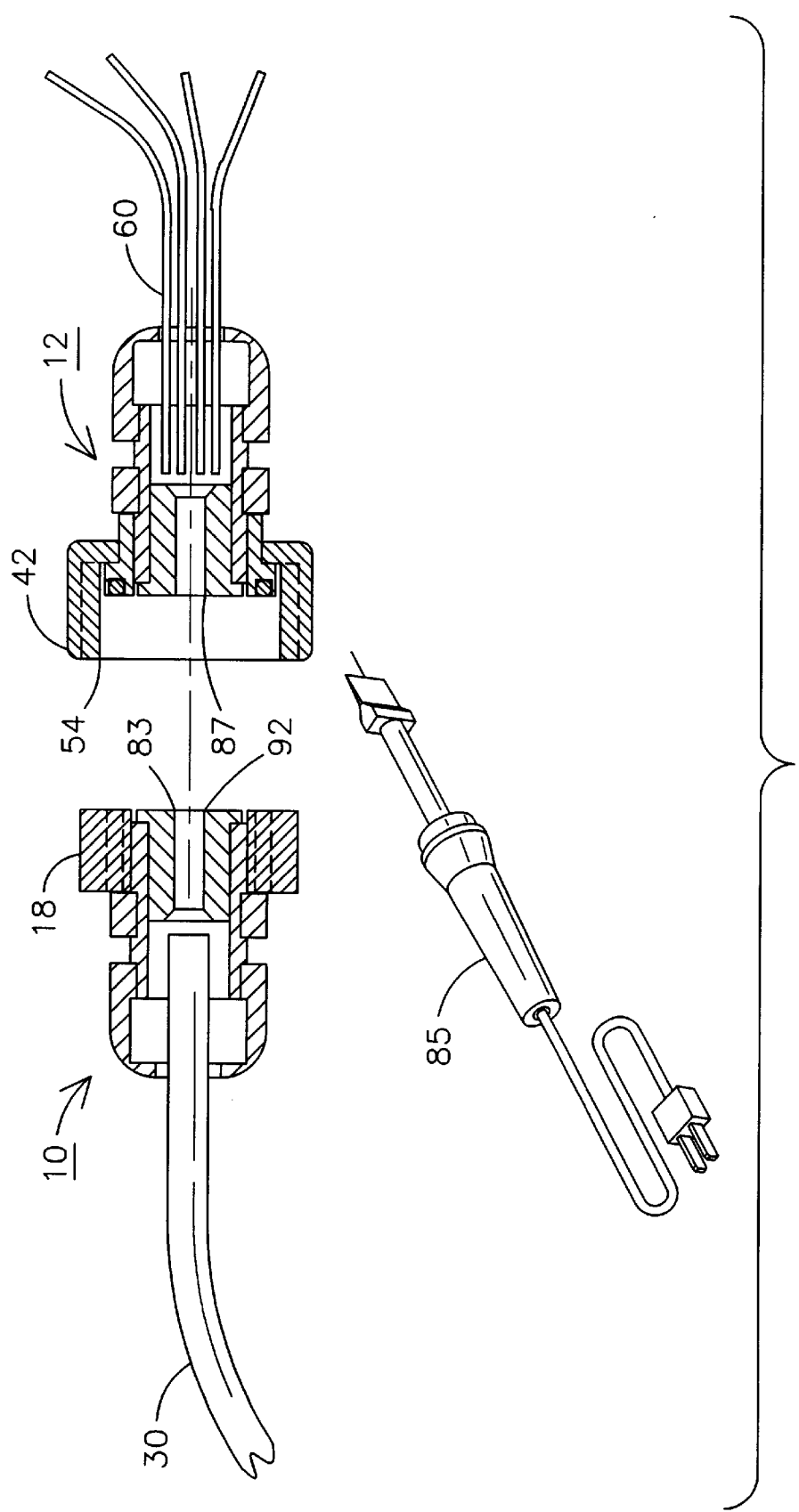
FIG. 3 is an embodiment of the present invention as illustrated in FIG. 2 with a cable inserted in each part.

Before describing in detail various aspects of the present invention, it should be observed that the present invention broadly comprises a novel combination of components configured to quickly and reliably meet the repair needs when a fiber optic cable or strand is damaged or severed. Accordingly, these components have been represented by components in the drawings, showing only those specfic details that are pertinent to the present invention, so as not to obscure the disclosre with structural details or operational interrelationships that will be readily apparent to those skilled in the art having the benefit of the description herein. With reference to the drawings, exemplary embodiments of the invention will now be described.

As illustrated in FIG. 1, the present invention offers an apparatus for connecting ends of a fiber optic cable together or for connecting a respective end from a first fiber optic cable to a respective end from a second fiber optic cable. In particular, FIG. 1 is an exemplary illustration of the components needed, separated into individual elements, but when completely connected form the apparatus. The first set of components, or first fitting, 10 includes a first strain relief 16. In a preferred embodiment, the strain relief 16 has an opening through its center that extends the length of the strain relief 16, forming a chamber. The opening is cylindrical in shape with a smaller diameter at a first end 24 and a larger diameter at a second end 26. In a preferred embodiment, an outer surface of the second end 26 of the strain relief 16 is threaded to fit within an adapter 18. Approximately midway between the first end and the second end of the strain relief 16, a stopper element 20 is located on the outside surface of the strain relief 16. As illustrated in FIGS. 3 and 4, the stopper element 20 defines a distance the adapter 18 will fit on the strain relief when the apparatus 5 is assembled.

In another preferred embodiment, the strain relief 16 comprises two parts. The strain relief 16 has a cap 22 that is removable from a basic stem 23. The cap 22 may be attached to the stem 23 with mechanical connection such as a threaded connection or a snap connection. The stem 23, which receives the cap 22 is segmented (not shown) so that when the cap 22 is connected to the stem, the tightening of the cap 22 onto the stem 23 causes the opening in the stem to be reduced in diameter. Thus, when a cable 30 is in place, as illustrated in FIGS. 3 and 4, the reduced opening at the first end 24 assists in securing the cable 30 in place.

An insert 28 fits within, or engages, the second end 26 of the strain relief 16. The insert 28 has an opening that extends from a first end 32 to a second end 34 of the insert 28. In a preferred embodiment, the opening at the first end 32 of the insert 28 has a funnel-like shape. The outer surface of the second end 34 has a stopper, or stopper device, 36 that defines a distance the insert will fit within the strain relief 16.

The adapter 18 has a chamber that extends from a first end to a second end. Though not necessary, in a preferred embodiment, the diameter 40 of the chamber is constant from the first end to the second end. The interior wall 40 of the chamber is threaded to receive the threaded outer surface of the strain relief 16. Thus, when connected as illustrated in FIG. 2, the insert 16 is secured within the strain 16 relief, and the strain relief 16 and adapter 18 are mated together by way of each component's respective threads. In another embodiment, neither the strain relief 16 nor adapter 18 have threads. Instead, the mated surfaces are smooth and glue or some other mechanical connection, such as a detent, is used to connect the pieces.

As further illustrated in FIG. 1, the second set of components, or second fitting, 12 includes a second strain relief 70. As previously discussed, the second strain relief 70 can be one or two pieces. In a preferred embodiment, the first and second strain reliefs 16, 70 are identical, but there is no requirement for the first strain relief 16 to be identical to the second strain relief 70. The second set of components, or second fitting, 12 includes a second insert 72 that fits within, or engages, the second end 74 of the second strain relief 70. A clamp nut 42 fits over the second end 74 of the second strain relief 70. The clamp nut 42 has an opening in its center, forming a chamber, where a first end 52, closest to the strain relief 70, is a smaller diameter than a second end 54. The smaller opening at the first end forms a lip 75 on the inside of the chamber. A flange 44 fits within the clamp nut 42. The flange 44 has a chamber formed through its center that extends from a first end 46 to a second end 48. A stopper 50 is located on the outer surface of the second end 48. On a base 56 of the stopper 50 on the flange 44 is a groove, or channel 58. An O-ring 60 fits within the groove. In a preferred embodiment, the inner surface of the opening in the flange 44 is threaded to accept the threaded outer surface of the second strain relief 70. A stopper device 80 on the outer surface of the second strain relief 70 defines a distance for connecting the flange 44 to the strain relief 70. When the flange 44 is placed through the first end 52 of the clamp nut 42 and is then connected to the strain relief 70, the stopper 80 on the flange 44 connects to the lip 75 on the inside of the clamp nut's chamber.

As illustrated in FIG. 4, the adapter 18 fits within the second end 54 of the clamp nut 42, forming a connector 82. In a preferred embodiment, the outer surface of the adapter 18 is threaded and is received within the second opening 54 of the clamp nut 42, which is also threaded to receive the adapter 18. In another preferred embodiment, the mated surfaces are smooth and glue or some other mechanical connection, such as a detent, is used to connect the pieces.

In another preferred embodiment (not shown), the first and second insert 28, 72 are segmented around the outer surface away from the stopper 34, 77. When each insert 28, 72 is placed within its respective strain relief 16, 70, the inner chamber at the first end 32, 78 decreases in diameter as the inserts 28, 72 are placed further into its respective strain relief 16, 70. Thus, when either an individual strand 60, a plurality of individual strands 60 from a fiber optic cable or a fiber optic cable 30 are placed within the inserts 28, 72, the cable 30 or strands 60 are held in place once the diameter of the insert 28 is narrowed by its insertion into the strain relief 16. Thus, as illustrated in FIGS. 3 and 4, either a fiber optic cable 30, individual strands 60, or a combination of a cable 30 and individual strands 60 can be spliced with the present invention.

In operation, once a cable 30 or strands 60 are damaged or severed, a user will cut out the damaged segment where the remaining ends are smooth and the cable ends have a flat planar surface, as illustrated in FIG. 3. The ends may be cut either before placing the cable 30, or strands 60, in each respective fitting or after the cables are secured within each respective fitting 10, 12 or after the cables 30 or strands 60 are secured within each respective fitting 10, 12. The cables may be cut with a hot knife 85 or another apparatus capable of producing a smooth planar cut of a fiber optic cable 30 or strands 60. The cables should be cut so that the respective ends will be able to be secured flush with the other cable end when secured within the apparatus.

In general, a first fiber optic cable 30, or strands 60, are inserted in a first end of a first fitting 10. The fiber optic cable 30 or strands 60 are secured in the first fitting 10 so that the ends of the fiber optic cable extending from a second end 83 of the first fitting 10 are flush with the end of the fitting 10. Once both fittings 10, 12 have a fiber optic cable 30 or strands 60 secured, the fittings 10, 12 are connected together so that the respective ends of each fiber optic cable make contact. The ends of the fiber optic cables 30 that will eventually be connected to the other cable may be cut either prior to securing the cables in each respective fitting or after the cables are secured.

In more detail, the first cable 30, or strands 60, are inserted into the first strain relief 16 and into the first insert 28 until the end of the first cable 30 or strands 60 are flush with the second end of the insert 28. The insert 28 is then fixed within the first strain relief 16. The same procedure is followed for placing the second cable 30 or strands 60 within the second strain relief 70 and the second insert 72. The adapter 18 is then connected to the first strain relief 16, either using each component's respective threads, or by another connecting method discussed previously. The clamp nut 42 is placed over the second strain relief 70. The flange 44 is then connected to the second strain relief 70, either using each component's respective threads, or by another connecting method discussed previously. The O-ring 60 is fixed within the base 56 of the flange 44. The adapter 18 is then connected to the clamp nut 42, either by each component's respective threads, or using another connecting method discussed previously. As the adapter 18 connects with the clamp nut 42, the O-ring 60 contacts the adapter 18 and creates a seal, preventing light energy from escaping from the apparatus 5 at the point the ends of the cable 30, or stands 60, are coupled together.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. An apparatus for connecting an end of a first fiber optic cable to an end of a second fiber optic cable, said apparatus comprising:

a first fiber optic cable comprising at least one plastic fiber;

a second fiber optic cable comprising at least one plastic fiber;

a first fitting have a cavity for securing said end of said first fiber optic cable;

a second fitting for securing said end of said second fiber optic cable; and a connector for joining said first fitting to said second fitting to hold said end of said first fiber optic cable in alignment with said end of said second fiber optic cable to allow light to pass therebetween.

2. The apparatus of claim 1 wherein said connector comprises an adapter connected to said first fitting and a clamp nut connected to said second fitting where said adapter and said clamp nut are mechanically fastened together.

3. The apparatus of claim 2 wherein said adapter comprises a chamber formed therethrough and said clamp nut comprises a chamber formed therethrough where a first opening of said chamber is larger than a second opening of said chamber where said second opening has a lip formed inside of said chamber.

4. The apparatus of claim 3 further comprising a flange having a chamber formed therethrough and having a stopper extending from an outer surface of said flange at a base.

5. The apparatus of claim 4 wherein second fitting comprises a strain relief wherein said second strain relief comprises a threaded outer surface and said flange is threaded on an inner surface and connects with said second strain relief.

6. The apparatus of claim 5 wherein said strain relief further comprises a stopper on an outer surface that defines a distance for screwing said flange on said strain relief.

7. The apparatus of claim 4 further comprising an O-ring wherein said flange further comprises a channel in said base for accepting said O-ring.

8. The apparatus of claim 7 wherein said adapter contacts said O-ring and said base of said flange when screwed into said clamp nut.

9. The apparatus of claim 4 wherein said flange is disposed therethrough said first opening of said chamber of said clamp nut wherein said flange stopper connects said lip of said second opening of said chamber.

10. The apparatus of claim 3 wherein said first fitting comprises a strain relief wherein said strain relief comprises a threaded outer surface and said adapter comprises a threaded inner surface whereby said adapter screws onto said strain relief.

11. The apparatus of claim 10 wherein said strain relief further comprises a stopper on an outer surface that defines a distance for screwing said adapter on said strain relief.

12. The apparatus of claim 2 wherein an outer surface of said adapter is threaded and an inner surface of said clamp nut is threaded wherein said adapter and said clamp nut are screwed together.

13. The apparatus of claim 1 wherein said first fitting comprises a strain relief having a center chamber formed therethrough and an insert that engages said center cavity for securing said fiber optic cable.

14. The apparatus of claim 13 wherein said strain relief comprises a cap and said strain relief is segmented at an end which said cap is connected.

15. The apparatus of claim 1 wherein said second fitting comprises a strain relief having a center chamber formed therethrough and an insert that engages said center chamber for securing said fiber optic cable.

16. The apparatus of claim 15 wherein said insert further comprises a stopper on an outer surface that defines a distance for engaging within said chamber of said stain relief.

17. The apparatus of claim 1 further comprising a cutting device for cutting said end of said first fiber optic cable said end of said second fiber optic cable to form respective surface defining planes whereby said ends of said first optic cable and said second optic cable are flush when joined by said connector.

18. A method for connecting an end of a first fiber optic cable to an end of a second fiber optic cable, said method comprising:

inserting an end of a first optic cable in a first fitting;

securing said first optic cable in said first fitting whereby said end of said first optic cable is flush with an end of said fitting;

inserting an end of a second optic cable in a second fitting;

securing said second optic cable in said second fitting whereby said end of said second optic cable is flush with an end of said fitting;

connecting said first fitting to said second fitting whereby said end of said first optic cable is flush with said end of said second optic cable.

19. The method of claim 18 further comprising:

cutting said end of a first optic cable;

cutting an end of a second optic cable having a planer surface which mates said first optic cable.

20. The method of claim 18 further comprising placing an O-ring between a surface where said first fitting and said second fitting make contact when connected.

* * * * *